United States Patent [19]
Ferriss

[11] 3,877,313
[45] Apr. 15, 1975

[54] ELECTROSTATIC ACCELEROMETER

[75] Inventor: Lincoln S. Ferriss, Madison, N.J.

[73] Assignee: The Singer Company, Little Falls, N.J.

[22] Filed: July 23, 1973

[21] Appl. No.: 381,771

[52] U.S. Cl. .............................. 73/516 R; 73/517 B
[51] Int. Cl. ............................................ G01p 15/08
[58] Field of Search .............. 73/517 B, 516 R, 503; 308/10

[56] References Cited
UNITED STATES PATENTS

| | | | |
|---|---|---|---|
| 3,209,601 | 10/1965 | Stiles | 73/517 B |
| 3,229,530 | 1/1966 | Wilcox et al. | 73/517 B |
| 3,318,158 | 5/1967 | Bromander et al. | 73/517 B |
| 3,491,600 | 1/1970 | Kasparian | 73/503 |
| 3,508,444 | 4/1970 | Sitomer et al. | 73/517 B |
| 3,742,767 | 7/1973 | Bernard et al. | 73/517 B |

Primary Examiner—James J. Gill
Attorney, Agent, or Firm—T. W. Kennedy

[57] ABSTRACT

In a digital pendulous accelerometer an electrostatic pulsed torque rebalance loop is used to restore the seismic mass to a null position by means of separately energized capacitive torquer plates facing opposite sides of the pendulum. When the pendulum is displaced to one side of null, the torquer plate which will drive the pendulum toward null is energized via a constant current loop in response to a binary pulse output indicative of the direction of displacement at regular sampling intervals. The difference in the number of pulses indicative of displacement to either side of null over a time period spanning a number of sampling intervals is proportional to the magnitude of the change in velocity over the time period. Accuracy is independent of the location of the pendulum between the torquer plates because, by virtue of the constant current loop, the torque — producing field intensity in the gap between the pendulum and either plate is independent of the pendulum location.

9 Claims, 14 Drawing Figures

ELECTROSTATIC ACCELEROMETER

BACKGROUND OF THE INVENTION

The invention relates generally to inertial apparatus, and more particularly to accelerometers in which displacement of a seismic mass caused by acceleration is compensated for by applying a measured force or torque to restore the mass to its initial or null porition.

Extremely accurate light-weight accelerometers are the heart of present-day inertial guidance systems for aircraft, missiles, and space vehicles. In a pendulous accelerometer having a hinged seismic mass, the rebalance force is usually applied by magnetic circuits requiring a number of wound components. A linear electrostatic accelerometer departing from the magnetic rebalance method is shown in U.S. Pat. No. 3,446,079 issued May 27, 1969 to R. M. Hohenstein and assigned to the same assignee as this application. This system illustrates an axially movable seismic mass rather than a pendulous mass. Electrostatic rebalance force is applied by generating a potential difference between a ring of liquid mercury and the adjacent side of the conductive seismic mass. Insulating layers of different dielectric constants separate the mass from the mercury ring. Electrostatic potential causes displacement of the seismic mass in that direction which tends to locate the material of lower dielectric constant in the capacitive gap. Since the direction of the electrostatic field in the Hohenstein patent is perpendicular to the acceleration sensing axis, the capacitive spacing remains constant. Applying a null-restoring electrostatic field in the same direction as the sensing axis would result in varying the spacing between the plates of the capacitor which in turn would ordinarily alter the rebalance force acting on the mass. In fact, the capacitance is so dependent upon the capacitive gap width that this principle is ordinarily used as a pick-off mechanism, as in the Hohenstein patent, to detect displacement of the seismic mass rather than to apply rebalance force.

SUMMARY OF THE INVENTION

The general purpose of the invention is to provide an all-electrostatic accelerometer in which magnetic circuits are eliminated and electrostatic rebalance force is applied by electric fields approximately coaxial with the acceleration sensing axis. A specific object of the invention is to render the rebalance force applied in this manner inherently independent of the location of the seismic mass.

In the electrostatic pendulous accelerometer according to the present invention, an electrostatic pulsed torque rebalance loop is used to restore the seismic mass to a null position by means of separately energized capacitive torquer plates facing opposite sides of the pendulum such that the electric fields generated thereby are approximately parallel to the acceleration sensing axis. When the pendulum is displaced to one side of null, the torque plate which will drive the pendulum toward null is energized by a constant current loop via an electronic switching circuit responsive to a binary pulse output indicative of the direction of the displacement at regular sampling intervals. The difference in the number of pulses indicative of displacement to either side of null over a time period spanning a number of sampling intervals is proportional to the magnitude of the change in velocity over the time period. Accuracy is independent of the location of the pendulum between the torquer plates because, by virtue of the constant current loop, the torque-producing field intensity in the gap between the pendulum and either plate is independent of the pendulum location.

To establish the constant current loop, a high gain differential amplifier is used having one input connected to a source of very stable reference voltage and the other input connected to the junction between a grounded, fixed resistor and the conductive pendulum body or conductive plates on a nonconductive pendulum body. The output of the amplifier is fed to the switching network which, in response to the control pulse output from a sampling unit, applies the output of the amplifier to one of the two torquer plates. The pendulum itself supplies the other side of the capacitor and completes the feedback path to the high gain amplifier. Because of the high gain of the amplifier, the current in either loop for the respective torquer plates is held at a constant value approximated by the reference voltage divided by the fixed resistance. Depending on the direction or polarity of the pendulum's displacement relative to its null position, the switching network closes the output of the amplifier to that torquer plate which will produce a restoring torque in the direction of null. At the onset of each sampling period, the switching network momentarily connects the torquer electrodes, the amplifier output and negative input terminal together to discharge the torquer electrode gap capacitances so that there is no residual electric field at the start of the sampling period.

Using digital counting circuitry, the number of times that rebalance torque in one direction was applied to the pendulum can be compared with the number of times torque was applied in the other direction over a time interval spanning a number of sampling periods. The difference between the number of "positive" and "negative" torque pulses is proportional to the change in velocity over the time interval, and thus the "rate" of the pulse count difference is proportional to acceleration. This relationship is due to the effect of the constant current loop which insures that each time a rebalance force is applied to the pendulum by pulsing one of the torquer plates, the velocity change or "increment" is of the same magnitude.

In the preferred embodiment the pendulum assembly includes a nonconductive pendulous mass in the shape of a flat, U-shape yoke withe its parallel end pieces connected to "necked-down" flexure hinges supported on a base. Each side of the pendulous mass is covered with two strips of electrically conductive material forming inner pick-off and torquer electrodes. The pendulum assembly is sandwiched between bottom and top plates separated by gastight spacers to allow movement of the pendulous mass under acceleration. The inner sides of the bottom and top plates each carry "outer" torquer and pick-off electrodes opposite the corresponding conductive strip on the adjacent side of the pendulum. The space inside the bottom and top plates is filled with a pressurized gas having high dielectric breakdown strength and invariant dielectric constant. The two pairs of adjacent inner and outer pick-off electrodes form pick-off capacitors whose relative capacitance, varied by the change in capacitive gap width due to pendulum movement, is compared to indicate the polarity of displacement. The two pairs of adjacent inner and outer torquer electrodes form the rebalance capacitors to provide null-restoring torque according to the polarity of displacement.

DESCRIPTION OF THE PREFERRED EMBODIMENT

Figure 1:
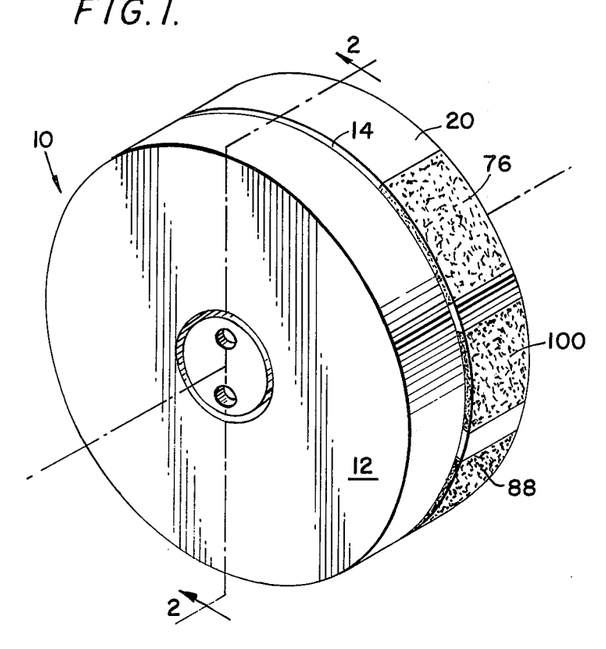
FIG. 1 is a perspective view of the sensing unit of the accelerometer according to the invention.
Figure 2:
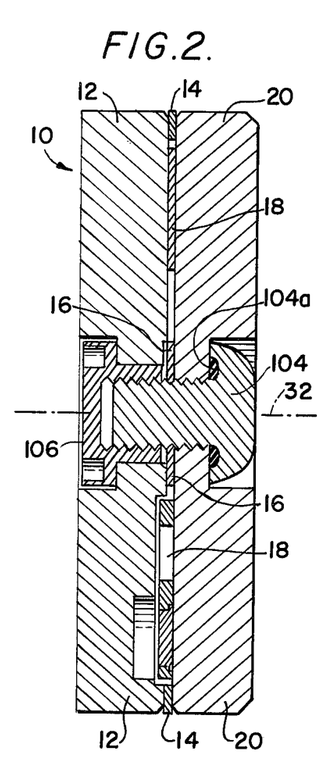
FIG. 2 is a sectional view taken along the line 2—2 of FIG. 1.

A preferred embodiment of the sensing unit containig the pendulous mass is illustrated in FIGS. 1–7 The instrument 10 comprises five separable main components: a disc-shaped bottom plate 12, a ring-shaped outer spacer 14, a washer-like inner spacer 16, a pendulum assembly 18 and a disc-shaped top plate 20. When fully assembled, as shown in FIGS. 1 and 2, the unit 10 assumes the shape of a discshaped wafer about seven-eights of an inch in diameter and one-fourth of an inch in height or thickness, equivalent roughly to the dimensions of a stack of four nickel coins.

The pendulum assembly 18 (FIGS. 3 and 4) includes a flat, U-shaped pendulum 22 connected at its ends to an approximately co-planar base 24, by means of a pair of flexure hinge members 26 and 28. Each member 26 and 28 has a necked-down portion 30, formed by closely adjacent bores in the metal blank, to provide a flexure or hinge which resiliently mounts the pendulum 22 to the base 24 so that the pendulum 22 is capable of pivoting about the hinge axis 30a in the direction of the acceleration sensing axis 32 (FIGS. 1 and 2), perpendicular to the paper in FIG. 4. The base 24 and pendulum 22 are preferably made of a nonconductive, chemically stable metal such as aluminum oxide (e.g., Lucalox, trademark), and the hinge members 26 and 28 are made of a thermally compatible, electrically conductive metal, preferably easy to machine, such as titanium.

Because the pendulum is to provide capacitive plates on which the electrostatic force may act, electrically conductive material must be deposited on the surfaces of the pendulum 22 along with suitable output leads. Hence, on each side of the pendulum 22, metallic plating is deposited in the form of a pair of strips 34 and 36. Strip 34 represents one of the inner pick-off electrodes associated with the angle sensing electronics, and strip 36 represents one of the inner torquer electrodes for applying rebalance torque to the pendulum 22. The electrical conductors associated with the pick-off and torquer circuits are designated by heavy and light stippling, respectively, throughout FIGS. 4–7. To provide an electrical lead for the conductive pick-off strip 34 one edge of the pendulum 22 is coated with electrically conductive material 38 in electrical contact with the strip 34 and hinge member 28. Similarly the torquer strip 36 is electrically connected to the other hinge member 26 by another conductive strip 40 on the surface overlapping the other edge of the pendulum 22. The electrical connections are completed through the hinge members 26 and 28 in electrical contact with plated regions 42 and 44 on the base 24. Conductive buttons 46 and 48 are inserted through the plate 24 in electrical contact with the conductive regions 42 and 44 respectively.

Figure 4:
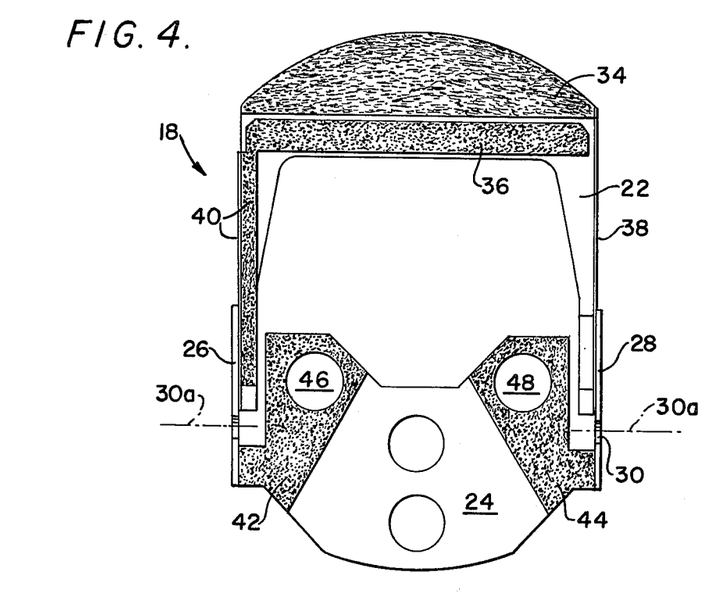
FIG. 4 is a plan view of one side of the pendulum assembly shown edgewise in FIG. 3.
Figure 5:
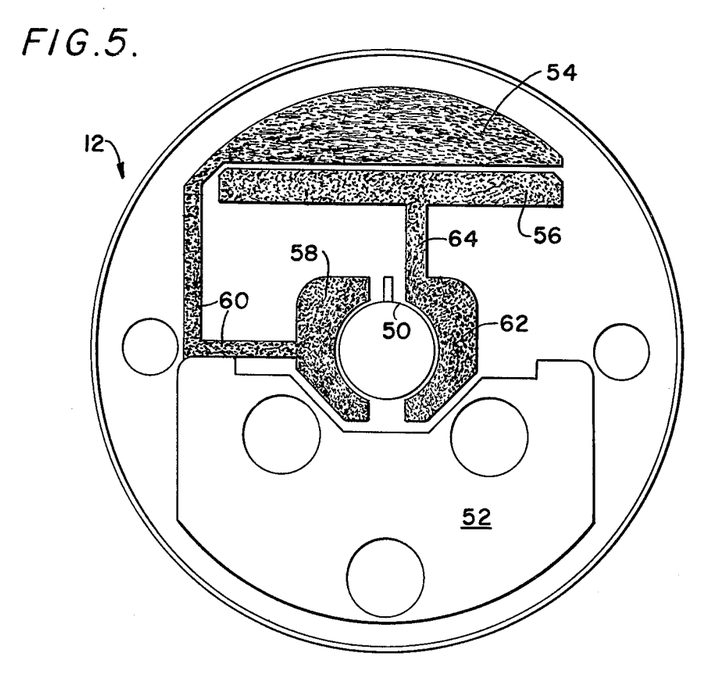
FIG. 5 is a plan view of the inner side of the bottom plate of the unit of FIG. 1.

In FIG. 5 the bottom plate 12 is provided with a central bore 50 and a recessed area 52 corresponding to the shape of the base 24 of the pendulum assembly 18 (FIG. 4). The bottom plate 12 is also made of a nonconductive material, preferably aluminum oxide, and is plated with electrically conducted strips 54 and 56 forming respectively one set of outer pick-off and torquer electrodes. The pick-off strip 54 is electrically connected to a semicircular strip 58 surrounding one-half of the central bore 50 by means of a plated electrical lead 60. Similarly, the torquer strip 56 is interconnected with another semicircular strip 62 opposite the strip 58 by means of a plated lead 64.

Figure 6:
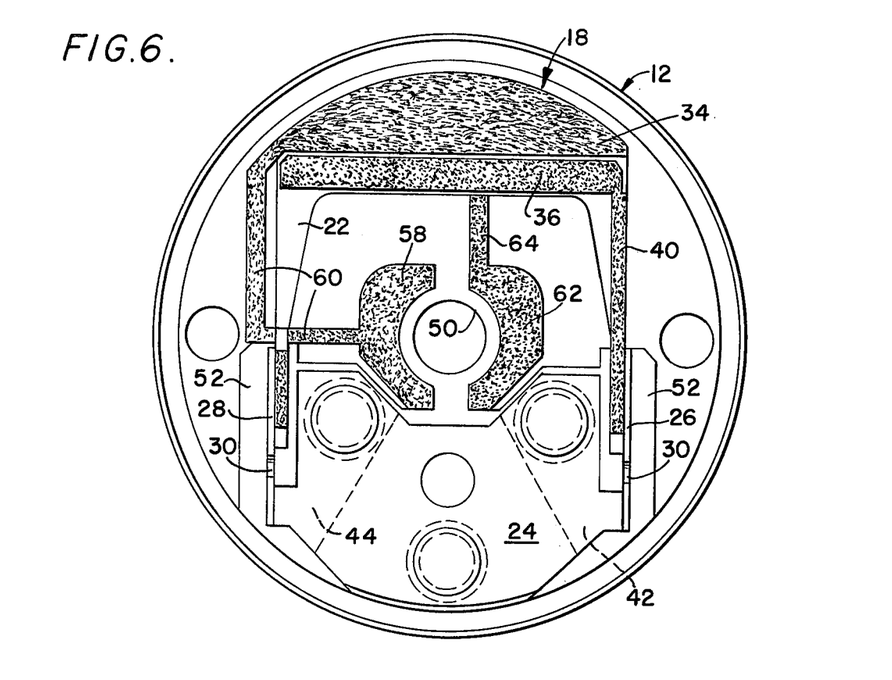
FIG. 6 is a plan view, as in FIG. 5, of the bottom plate with the pendulum assembly of FIG. 4 mounted therein, the reverse side of the pendulum assembly being in view in FIG. 6.

The instrument 10 is shown partially assembled in FIG. 6 with the pendulum assembly 18 mounted in the bottom plate 12. It should be noted that in this view the side of the pendulum assembly 18 which is in view is opposite that visible in FIG. 4. The inner pick-off and torquer electrode strips 34 and 36 shown in FIG. 6 correspond to those on the other side shown in FIG. 4.

Figure 3:
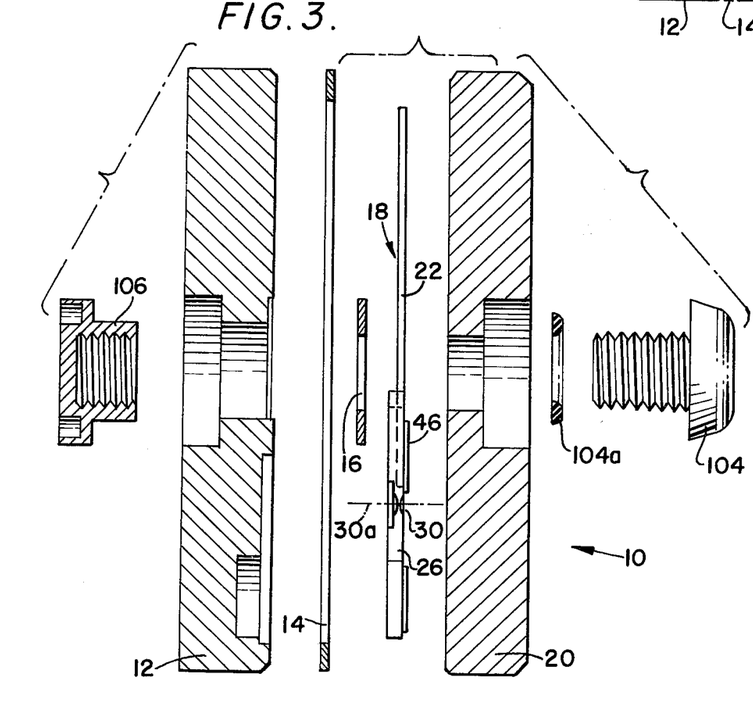
FIG. 3 is an axially exploded side sectional view similar to that of FIG. 2.
Figure 7:
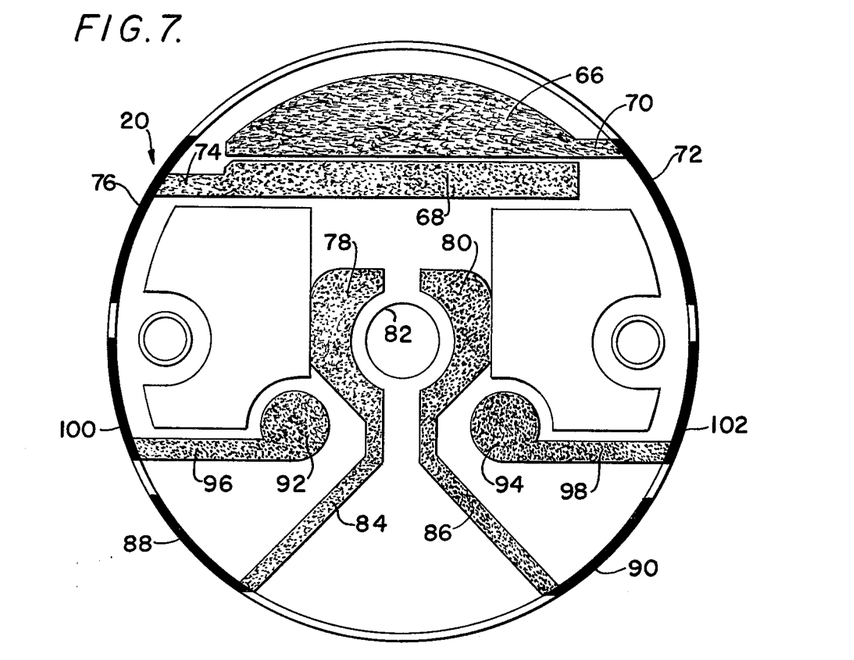
FIG. 7 is a plan view of the inner side of the top plate of the unit of FIG. 1.

The inside surface of the top plate 20 is shown in FIG. 7. Like the bottom plate 12, the top plate 20 is plated with electrically conductive material in a pattern to form a pair of electrically conductive strips 66 and 68 forming, respectively, the other set of outer pick-off and torquer electrodes. The pick-off strip 66 is electrically connected by a plated lead 70 to an electrically conductive band 72 deposited on an outer periphery of the top plate 20 to form an external terminal for the sensing unit 10 (FIG. 1). Similarly, the torquer strip 68 is connected by means of a plated lead 74 to another external band 76. Semicircular strips 78 and 80 of conductive material surround a central bore 82 through the top plate 20. The semicircular strips 78 and 80 are connected by plated leads 84 and 86 to respective outer bands 88 and 90. The semicircular strips 78 and 80 correspond in location to the strips 58 and 62 on the bottom plate, respectively. When the instrument is assembled, semicircular strips 78 and 62 and strips 80 and 58 are brought into electrical contact by means of spacer 16 (FIG. 3). Spacer 16 has a similar pattern of plated, electrically conductive material formed on both surfaces with the corresponding patterns on opposite sides being connected by means of edge plating (not shown). The top plate 20 also includes a pair of circular plated areas or dots 92 and 94 connected respectively via plated leads 96 and 98 to bands 100 and 102 on the outer surface of the top plate 20. The locations of the plated circles 92 and 94 correspond to the locations of the buttons 46 and 48 on the pendulum base 24. When the instrument 10 is assembled, the buttons 46 and 48 come into electrical contact with the plated circles 92 and 94. Hence, the outer bands 100 and 102 provide electrical terminals for the inner pick-off and torquer electrodes on the pendulum 22. Bands 88 and 90 form the terminals for the set of outer pick-off and torquer electrodes on the bottom plate 12, and bands 72 and 76 provide the terminals for the other set of outer pick-off and torquer electrodes of the top plate 20.

The outer spacer 14 (FIGS. 1, 2 and 3) is designed to have an axial thickness slightly larger than the thickness of the pendulum 22 to give the pendulum room to pivot slightly in either axial direction. The unit is hermetically sealed by means suitable vacuum-tight adhesives applied to the surfaces of the outer and inner spacers 14 and 16. The five components of the instrument 10 are further secured by means of bolt 104 with an O-ring seal 104a and a retaining nut 106 received through the center bores 50 and 82 (with suitable exterior counter bores) of the bottom and top plates 12 and 20 respectively. The interior volume of the instrument 10 is occupied by a pressurized gas having high dielectric breakdown strength and invariant dielectric constant, suitable for sustaining high intensity electrical fields between corresponding torquer plates without reacting adversely with the metals used in the unit.

The electronic circuitry illustrated in FIGS. 8–10 and 12 serves first to sense the angular displacement, $\theta$, of the pendulum 22 under input axis acceleration by means of the inner pick-off electrodes 34 and the outer pick-off electrodes 54 and 66, respectively. The angle information is then converted to an indication of polarity of the displacement, that is which side of null the pendulum 22 has moved to and this information is sampled once during every sample interval. If the pendulum is out of the null position, the sampled polarity of the pendulum displacement causes a pulse to be applied to that outer torquer electrode 56 or 68 which, by virtue of its capacitance with the adjacent inner torquer electrode 36, causes a torque to be applied in the direction of null, $\theta = 0$. An indication of velocity change is accomplished by guaging the difference between the number of sampled instances at which the pendulum was on one side or the other side of null. As will be shown below, this difference is proportional to the change in velocity over a given time interval.

Figure 8:
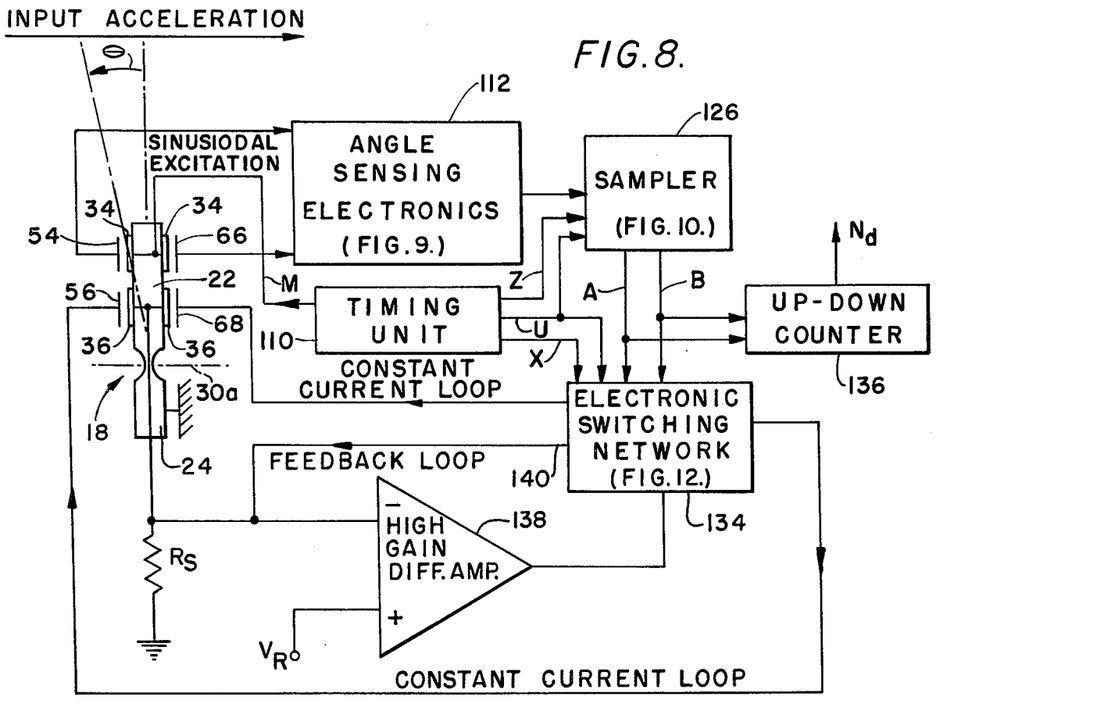
FIG. 8 is a schematic and block diagram of the accelerometer including the sensing unit of FIG. 1 and associated electronics according to the invention.

The inner pick-off electrodes 34 are connected in common via line M to a source of sinusoidal excitation of constant magnitude provided by a timing unit 110. The frequency of the excitation is typically about 100 KHz. Each pair of inner and outer pick-off electrodes, 34 and 54 or 34 and 66, forms a separate displacement sensing capacitor. A small alternating current flows in each of the displacement sensing capacitors. This current is proportional to the magnitude of the sinusoidal excitation, which is constant, and the capacitance value $C_n \pm \Delta C$, where $C_n$ is the capacitance at null and $\Delta C$ represents the change in capacitance due to pendulum displacement. If, for example, the pendulum 22 becomes angularly displaced in the direction of $\theta$, as shown in FIG. 8, the capacitance formed by electrodes 34 and 54 will increase to $C_n + \Delta C$ and that formed by electrodes 34 and 66 will decrease to $C_n - \Delta C$. The values $C_n + \Delta C$ and $C_n \times \Delta C$ are approximations based on small angular displacements.

Figure 9:
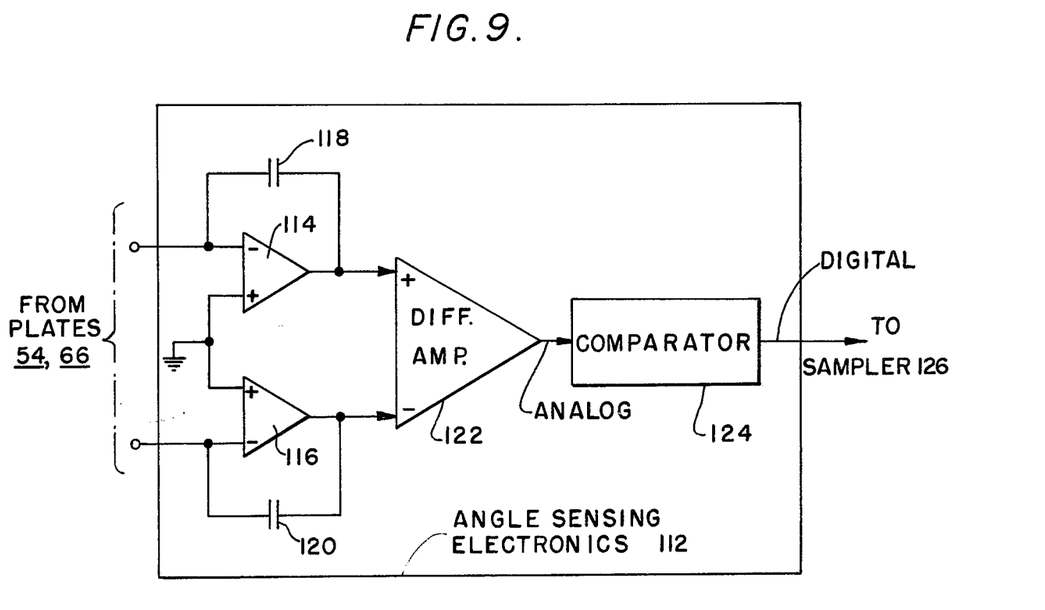
FIG. 9 is a block diagram illustrating the angle sensing electronics of FIG. 8 in more detail.

The fixed, outer pick-off plates 54 and 66 are connected to the angle sensing electronics 112, shown in more detail in FIG. 9. The plates 54 and 66 are connected respectively to amplifiers 114 and 116 each having feedback capacitors 118 and 120 respectively having the same constant capacitance, $C_f$. Because the feedback capacitance $C_f$ of the amplifier 114 and 116 remains constant, the gain through one amplifier channel is $C_f/(C_n + \Delta C)$, while the gain through the other channel is $C_f/(C_n - \Delta C)$, where the parenthetical terms represent the displacement sensing capacitances. Due to the different gain of the two channels, a net voltage is derived when the difference is taken with a differential amplifier 122, even when the pendulum is precisely at the null position. Because of the sinusoidal excitation (M) applied to the inner pick-off electrodes 34, the outputs of the amplifiers 114 and 116 are also sinusoidal. Hence the difference output of the differential amplifier 122 is also a sinusoidal waveform representing the algebraic difference in magnitude between the outputs of the amplifiers 114 and 116.

The analog output of the differential amplifier 122 is passed to a comparator 124 which continuously compares the analog output to a reference voltage. In the present case the reference input to the comparator 124 would be grounded, representing zero volts. Thus, the output of the comparator 124 indicates the instantaneous polarity of the differential amplifier output.

Figures 10, 11, 13, 14:
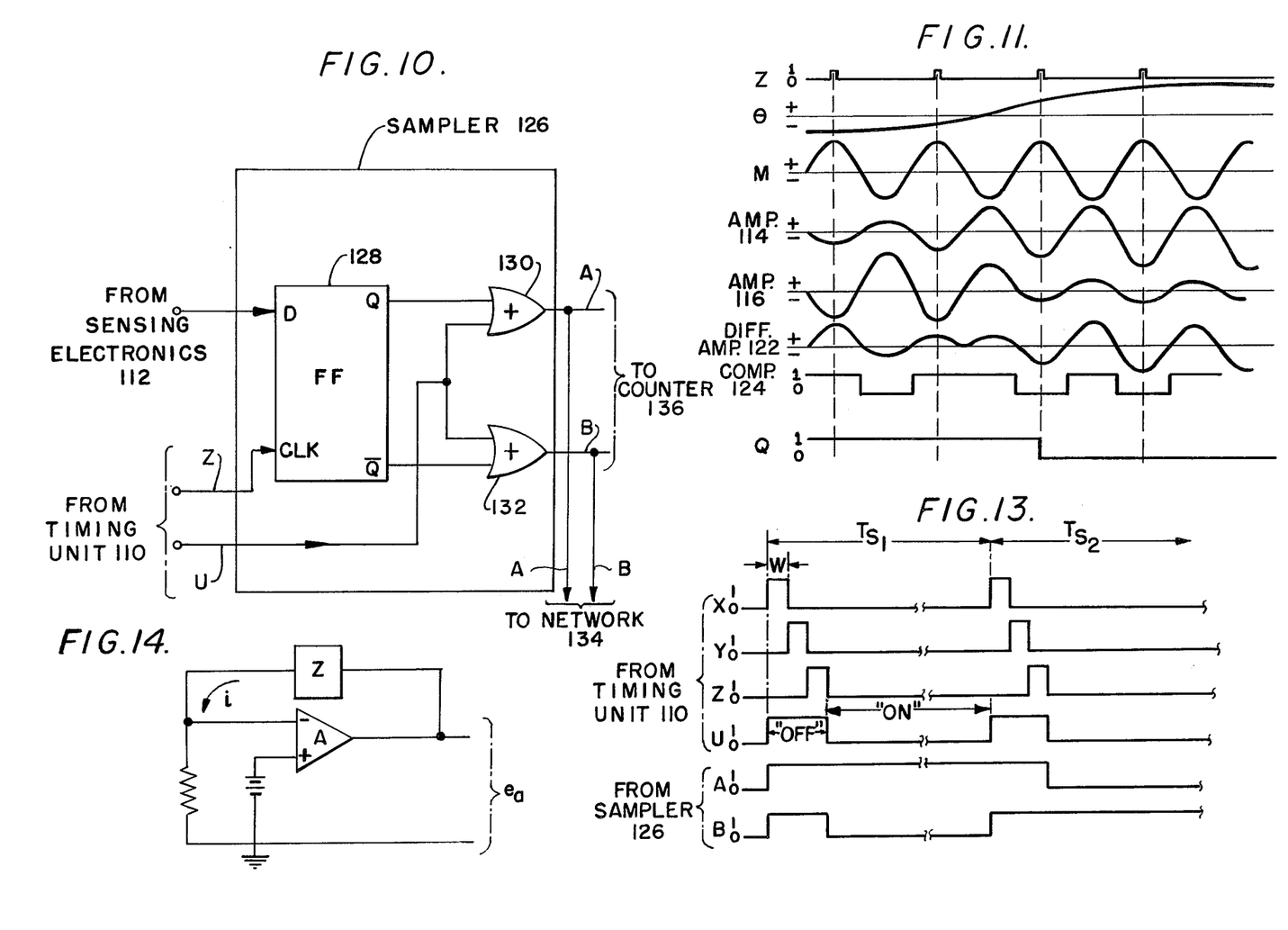
FIG. 10 is a block diagram illustrating the sampler of FIG. 8 in more detail.
FIG. 11 is a timing diagram illustrating a typical sequence of signals associated with the displacement sensing and indicating circuitry of FIGS. 8–10.
FIG. 13 is a timing diagram illustrating a typical sequence of binary control signals associated with the circuitry of FIGS. 8, 10 and 12.
FIG. 14 is a schematic and block diagram illustrating the constant current loop mechanism of the rebalance electronics of FIG. 8.

The digital output of the comparator 124 is passed to a sampler 126 (see FIG. 8) shown in detail in FIG. 10. The sampler 126 contains a conventional, clocked D-type flip-flop 128 storing an output Q and its complement $\overline{Q}$. The "D" input to the flip-flop 128 is taken from the output of the comparator 124 in the angle sensing electronics 112. The clock input Z to the flip-flop 128 is from the timing unit 110 (FIG. 8), which establishes the sampling period, $T_s$, that is the time interval from one sampling or clock pulse Z to the next.

The sampling period $T_s$ is exactly the same period as the frequency of the sinusoidal excitation M applied to the sensing capacitances. In addition, the sinusoidal excitation is phase-locked with respect to the clock pulse Z so that the output of the comparator 124 is sampled at exactly the same point during each cycle of the sinusoidal waveform M. Moreover, the point at which the clock pulse Z occurs during this cycle should coincide with the positive peak in the amplitude of the waveform M.

The relationship between the signals associated with the pick-off electronics portion of the system under dynamic conditions is illustrated in FIG. 11. The top line of this timing diagram represents the clock pulses Z, which occur at regular intervals with a sampling period $T_s$, which coincides with the perodicity of the sinusoidal excitation M in the third line from the top. The second line represents angular displacement, $\theta$, of the pendulum 22. As the angular position of the pendulum moves from negative $\theta$ to positive $\theta$ relative to the null position, the average magnitude of the output of amplifier 114 (FIG. 9) increases while that of amplifier 116 decreases. The complementary change in the amplifier outputs reflects the changing capacitance experienced by the pick-off electrodes 34, 54 and 66 (FIG. 8). The difference between these amplifier outputs appears in the sixth line as the fluctuating, but still sinusoidal, output of the differential amplifier 122. The lower line of the diagram indicates the "state" (Q) of the flip-flop 128 as it samples the polarity of the differential amplifier output indicated by the comparator 124. The flip-flop output Q changes state at the next sampling pulse Z following the change in polarity of where the pendulum passed through the null position.

The Q and $\bar{Q}$ outputs of the flip-flop 128 respectively form inputs to a pair of OR gates 130 and 132 in the sampler 126 (FIG. 10). OR gates 130 and 132 also have another common input, U, from the timing unit 110. The timing signal U corresponds to an off period between the times at which torquer pulses can be applied. When the timing signal U is 0, the outputs of the OR gates 130 and 132 are complementary and reflect the state of the flip-flop 128. Thus the output of OR gate 130 will be a binary 1 if the input from the comparator 124 was sampled at a time when the pendulum was displaced to the corresponding side of null. At the same time, the other OR gate 132 will produce a binary 0. Conversely, the OR gate 132 will have a binary 1 output and gate 130 will have a binary 0 output if the comparator output is sampled when the pendulum is displaced to the other side of null. When the timing signal U is a binary 1, the outputs of both gates 130 and 132 are binary 1's.

The output A of the OR gate 130 and output B of OR gate 132 are passed to an electronic switching network 134 and also form the basic output of the accelerometer. Outputs A and B would ordinarily be passed to an on-board navigational computer receiving outputs from other inertial sensors to calculate the vehicle's position and other data. As an illustration of the manner in which the outputs A and B can be used, FIG. 8 shows an up-down counter 136 which has a pair of inputs connected to outputs A and B respectively for incrementing and decrementing the difference output $N_d$ of the counter. Thus each time a 1 pulse from output A is applied to the counter 136, the running count is increased by one, and each time the output B is a binary 1, the running count is decreased by one. The resulting output $N_d$ of the counter 136 is the running difference between the number of binary 1 pulses in the output A and the number of binary 1 pulses in the output B from the sampler 126. By way of illustration, the counter 136 may also have means for resetting the difference count $N_d$ to zero. The counter would ordinarily be reset at the end of a time interval $t_2 - t_1 = Nt_s$, that is a whole number of sampling periods. The change in the difference count over the time interval $Nt_s$ is indicative of the change in velocity over that time interval.

In the rebalancing circuitry for applying restoring torque to the pendulum 22, the fixed outer torquer plates 56 and 68 are electrically connected to the electronic switching network 134 (FIG. 8). The inner torquer electrodes 36 on the pendulum 22 are connected in common to a grounded resistor $R_s$. The junction between the resistor $R_s$ and the torquer electrodes 36 is connected to the negative input of a high gain differential amplifier 138. The positive input of the amplifier 138 is connected to a stabilized source of reference voltage $V_R$. The output of the amplifier 138 is passed to the electronic switching network 134, and an amplifier feedback loop 140 is connected between the electronic switching network 134 and the negative input terminal of the amplifier 138. The purpose of the switching network 134 is to separately connect the output of the amplifier 138 with either one of the fixed torquer plates 56 or 68 via respective constant current loops in response to the outputs A and B of the sampler 126 which depend on the polarity of pendulum displacement. In addition, the switching network 134 connects the amplifier output to the feedback loop 140 momentarily before the time at which a torquer pulse can be applied to insure that the voltage on the inner torquer plates 36 is $V_R$.

Figure 12:
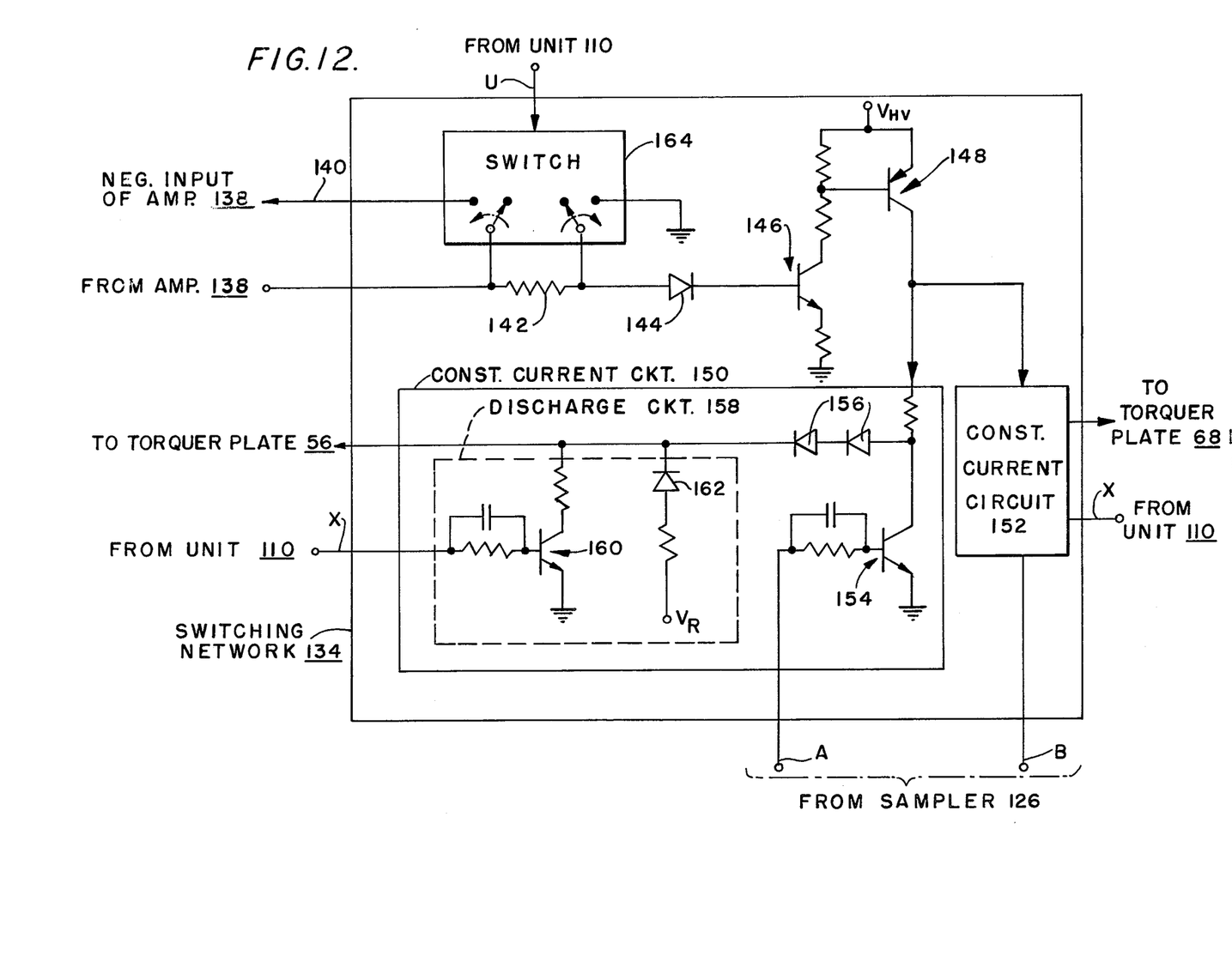
FIG. 12 is a schematic circuit diagram illustrating the electronic switching network of FIG. 8 in more detail.

The electronic switching network 134 is shown in detail in FIG. 12. The output of the amplifier 138 is connected in series with resistor 142 and diode 144 to the base of an NPN transistor 146. The collector of the transistor 146 is connected via resistance to the base of a PNP transistor 148. The collector and emitter of transistor 146 and 148, respectively, are connected to a source of high voltage $V_H$. When the output of the amplifier 138 is applied to the base of transistor 146, the collector of transistor 148 will be conducting. Transistors 146 and 148 provide a voltage level shift, as well as adding loop gain. The collector of the transistor 148 is connected to identical constant current circuits 150 and 152. Circuit 150, shown in detail, includes an NPN transistor 154 with a grounded emitter and a collector connected via a resistance to the collector of the transistor 148. The base of the transistor 154 is controlled by the sampler output A. The collector of the transistor 154 is also connected via a pair of diodes 156 to the fixed outer torquer plate 56 (FIG. 1). A discharge circuit 158 connected in parallel with the torquer plate 56 and includes an NPN transistor 160 with a grounded emitter and a collector connected via a resistance to the torquer plate 56. The base of the transistor 160 is controlled by timing signal X (FIG. 13) from the timing unit 110. In another parallel circuit, the torquer plate 56 is connected via a diode 162 to the stablized reference voltage $V_R$, the same voltage which is applied to the positive input of the high gain amplifier 138. The other constant current loop circuit 152 contains identical circuitry controlled by the sampler output B and the timing signal X, and produces an output to the outer torquer plate 68. An electronic switch 164, operated by the timing signal U from the timing unit 110 interconnects the output of the amplifier 138 with the amplifier's negative input during the off period between the times at which torquer pulses can be applied. In addition, the switch 164 simultaneously grounds the junction between the resistor 142 and diode 144, thus turning off both of the transistors 146 and 148, thereby stopping current from flowing during the off period.

The timing unit 110 (FIG. 8) contains conventional apparatus including a time base generator, chain dividers and necessary logic to provide timing signals X, Y, Z and U, as well as a phase-locked oscillator circuit to produce the sinusoidal excitation M applied to the inner pick-off electrodes 34. In FIG. 13, the sampling period $T_s$ represents the cycle time of the accelerometer. In practice the sampling period is about 160 microseconds. More importantly, however, the clock frequency and sampling period should be known and stable. The sampling period $T_s$ is divided into "off" and "on" periods. The off period corresponds to the time during which the charge on the torquer plates is equalized and the polarity of the pendulum displacement is interrogated. The on period corresponds to the interval of time during which rebalance torque is continuously applied to the pendulum 22. Timing signals X, Y, and Z are consecutive pulses of equal width W respectively. Timing signal X is a binary 1 at the start of the sampling period $T_s$ and returns to the 0 state after a very brief period of time, such as one microsecond, until the start of the next sampling period. Timing signals Y and Z occur in sequence in a similar manner once per sampling period $T_s$. The on/off indicator, timing signal U, is a binary 1 during the pulse sequence in timing signals X, Y and Z returns to the 0 state with the timing signal Z. Signal U remains in the 0 state until the beginning of the next sampling period. Thus, if the sampling period $T_s$ were exactly 160 microseconds and the equal pulse width W of timing signals X, Y and Z were 1 microsecond, the on/off signal U would be off (1) for three microseconds and on (0) for 157 microseconds during each sampling period.

In operation, with reference to the timing diagram (FIG. 13), the sampler 126 and electronic switching network 136 (FIGS. 10 and 12), as the sampling period $T_{s_1}$ begins, the timing signal U, indicating the off period, is applied to the OR gates 130 and 132 in the sampler 126 and to the switch 164. The latter switch 164 causes the output of the amplifier 138 to be connected to its negative input. In addition, the switch 164 grounds the base of the transistor 146 to halt the flow of current in the constant current loop during the off period. In the sampler 126, the outputs A and B are both binary 1's, which results in no difference count in the up-down counter 136 (FIG. 8). However, the application of binary 1's to the constant current loop circuits 150 and 152 through the leads A and B saturates the switching transistors (154) of the circuits. In addition, at the beginning of the off period the timing signal X is applied to the discharge circuits (158) in both constant current loop circuits 150 and 152. As a result, the discharge transistor 160 acts to discharge the corresponding torquer capacitor gap associated with the torquer plate 56 to value slightly below the reference voltage $V_R$. Following discharge, the timing signal Y, acting here as a spacer rather than a control signal, allows the capacitor associated with torquer plate 56 to charge through the diode 162 and its series resistance with the voltage $V_R$. At the same time, of course, the other torquer plate discharges and recharges the other capacitor so that both torquer capacitors at the end of the Y timing signal are charged to a net potential difference of zero.

Next, the timing signal Z is applied to the clock input of the flip-flop 128 to sample the output of the comparator 124 in the angle sensing electronics 112. Depending on the position of the pendulum with respect to null, either the Q or the $\overline{Q}$ output of the flip-flop will be a binary 1. The flip-flop output will remain in the same state for the remainder of the sampling period $T_{s_1}$ until the timing signal Z resamples the polarity of the pendulum displacement in the next sampling period. The sampler outputs A and B are both binary 1's during the off period (U) regardless of the pendulum displacement polarity. However, at the end of the off period where U returns to 0 only one of the outputs A and B will remain in the binary 1 state. Assuming that the output of the comparator 124 was a binary 1, indicating that the pendulum was displaced to one side of null, the flip-flop would store at the output Q a binary 1 which would remain applied to the OR gate 130 after the off period. As a result, the constant current circuit 150 will continue to receive a binary 1 via the sampler output A, thus saturating the transistor 154, while the corresponding switching transistor in constant current loop circuit 152 is nonconductive. Thus, for the entire on period, constant current will be applied to the torquer plate 68 to restore the pendulum to the null position.

In the next sampling period $T_{s_2}$, it is assumed that the pendulum polarity with respect to null has changed. Incidently, this would be the case, in the absence of acceleration, for a so-called "1/1 mode, bang-bang" type rebalancing system. That is, a single torquer pulse is sufficient to drive the pendulum through null. In other systems, to which this disclosure is equally applicable, it may take a sequence of several torquer pulses (for example, three for the 3/3 mode) to drive the pendulum through null. In this latter type of system the accelerometer output information would be suitably manipulated to take into account the fact that several pulses were required, for example, by registering an output only on the third or forth pulse.

At the end of the off period in sampling period $T_{s_2}$, the sampler output A returns to 0 and the sampler output B remains in the binary 1 state. Thus, the reverse operation is initiated, in which the constant current loop circuit 152 is disabled and the loop circuit 150 is enabled to apply constant current to the other torquer plate 56 to drive the pendulum in the opposite direction, again back toward the null position. If the alternating application of torque which occurred is consecutive sampling periods $T_{s_1}$ and $T_{s_2}$ continued over a number, N, of sampling periods $T_s$, no measurable velocity change would have been encountered over that time interval.

The following mathematical description demonstrates the proportionality of the difference count to the change in velocity. The summing torques about the flexure hinge axis 30a for small deviations. $\theta$, (FIG. 8), under which the spring force of the hinge is negligible, is:

$$I\ddot{\theta} + C\dot{\theta} = -Pa \pm M \qquad (1)$$

Where I is the moment of inertia, C represents the viscous damping coefficient due to the presence of the pressurized, dielectric gas, P is the pendulosity of the pendulum 22 and M is the applied rebalance torque. The significance of the polarity sign associated with M is the direction in which rebalance torque is acting, and therefore the sign identifies the gap in which a force is present. Integrating equation (1) over an interval $t_1$ to $t_2$:

$$I\dot{\theta}\Big|_{t_1}^{t_2} + C\theta\Big|_{t_1}^{t_2} = -P_v\Big|_{t_1}^{t_2} + \int_{t_1}^{t_2}(\pm M)\,dt \qquad (2)$$

Solving equation (2) for $v$:

$$V_2 - V_1 = \frac{1}{P} \int_{t_1}^{t_2} (\pm M)\, dt - V_s \quad (3)$$

where $$V_s = \frac{1}{P} (I\dot{\theta} + C\theta) \Big|_{t_1}^{t_2} \quad (4)$$

The values of $\dot{\theta}$ and $\theta$ are periodic for any fixed value of input acceleration by virtue of the binary force rebalance system. The quantity $V_s$ represents the velocity unavailable for readout from the accelerometer due to motion of the pendulum. The magnitude of $V_s$ can be reduced by driving the pendulum closer to null.

Selecting N sampling periods, $T_s$, which satisfy the periodicity of $\theta$ and $\dot{\theta}$ such that $V_s = 0$, that is, $t_2 - t_1 = NT_s$, equation (3) can be rewritten:

$$V_2 - V_1 = \frac{1}{P} \sum_{n=1}^{N} \int_{(n-1)t_s}^{nt_s} (\pm M)\, dt \quad (5)$$

where the integral terms represent torque over successive sampling periods.

If, over the whole time interval $NT_s$, M is positive (in one direction) for $n_2$ periods and negative (in the other direction) for $n_1$ periods, i.e., $n_1 + n_2 = N$, equation (5) becomes:

$$V_2 - V_1 = (n_2 - n_1)\left[\frac{1}{P}\int_0^{t_s} M\, dt\right] \quad (6)$$

The bracketed quantity in equation (6) is termed the "velocity increment," V, and represents the minimum quantization of velocity change. The parenthetical quantity, the pulse-count difference, multiplied by the velocity increment yields the velocity change over the time interval $NT_s$.

It will now be shown that the torque M and thus the velocity increment are independent of the gap width between the capacitive torquer plates, i.e., the location of the pendulum 22 relative to the fized torquer plates 56 and 68 (FIG. 8). The feedback or rebalance torque acting on the pendulum 22 is:

$$M = \epsilon A l \epsilon^2 \quad (7)$$

where $\epsilon$ is the dielectric constant of the gap fluid, A is the area of the torquer electrode, $l$ is the moment arm of the pendulum, and $\epsilon$ is electric field intensity. By definition:

$$\epsilon = V_c/g \quad (8)$$

where $V_c$ is the voltage or potential difference across the gap capacitance and g is the gap width. Also by definition:

$$V_c = \frac{1}{C} \int_0^t i\, dt \quad (9)$$

where C is the gap capacitance represented by $\epsilon A/g$ and $i$ is the current flowing in the gap capacitance. Combining equations (7), (8) and (9):

$$M = \left(\frac{l}{\epsilon A}\right)\left[\int_0^t i\, dt\right]^2 \quad (10)$$

Since the parenthetical term in equation (10) is a constant, if the bracketed current integral term can be made constant over a given time interval, the torque, M, will be independent of the gap width, $g$.

In FIG. 14 a schematic simplified circuit diagram is shown in which the differential amplifier with gain A corresponds to the high gain amplifier 146 in FIG. 8 and the impedance Z represents the total impedance offered by the current loop through either torque plate 56 or 68 during the on period. Assuming that no current flows in the input terminals of the amplifier:

$$e_a = A(V_R - i R_s) \quad (11)$$

$$e_a = i Z + i R_s \quad (12)$$

Solving simultaneously for $i$ by subtracting equation (12) from equation (11):

$$i = A V_R/Z + (1 + A)R_s \quad (13)$$

For a high gain amplifier and bounded values for $R_s$ and Z, the current approaches independency with Z as the amplifier gain approaches infinity:

$$I = \lim_{A \to \infty} i = \frac{V_R}{R_s} \quad (14)$$

Combining equations (14) and (10) for the high gain condition:

$$M = \frac{l}{\epsilon A}\left[I \int_0^t dt\right]^2 = \frac{l V_R^2 t^2}{\epsilon A R_s^2} \quad (15)$$

Equation (15) is independent of gap width, $g$. The velocity increment, the bracketed term in equation (6), becomes:

$$V = \frac{1}{P}\int_0^{t_s} M\, dt = \frac{l V_R^2 T_s^3}{3 P \epsilon A R_s^2} \quad (16)$$

Each output pulse from the accelerometer represents a change in velocity magnitude equal to V. It is important to note that the velocity increment V is proportional to the sampling period $T_s$ raised to the third power. Hence, The stability of the clock frequency is critical to the instrument's accuracy. Rewriting equation (6):

$$\Delta v = n_d V \quad (17)$$

where $\Delta v = V_2 - V_1$, and $n_d = n_2 - n_1$. Consequently, over the time interval $NT_s = t_2 - t_1$:

$$\Delta v / \Delta t = a_{avg} = n_d V \quad (18)$$

that is, the average acceleration is the product of the pulse-count difference rate times the velocity increment.

Thus the accuracy of the above-described accelerometer is independent of the location of the pendulum 22 between the torquer electrodes 56 and 68 (FIG. 8) because, by virtue of the constant current circuit, field intensity is independent of the gap width.

Those skilled in the art will recognize that this principle can be applied to conductive pendulum bodies that do not require torquer plates affixed to the pendulum as the pendulum itself forms the torquer plate. Moreover, the principle is also applicable in an obvious manner to apply restoring torque to nonpendulous, axially movable seismic masses. The manner in which the pendulum displacement is sensed, i.e., capacitively, is not a requirement of the force rebalance mechanism but is preferred because it simplifies the components and enables simplified construction of an all-electrostatic instrument.

It will be understood that various changes in the details, materials, steps and arrangements of parts which have been herein described and illustrated in order to explain the nature of the invention, may be made by those skilled in the art within the principle and scope of the invention as expressed in the appended claims.

I claim:

1. An accelerometer comprising a seismic mass mounted for displacement from a null position in response to input acceleration along a sensing axis, detecting means for producing an output signal indicative of the direction of said displacement, a pair of rebalance capacitors disposed on opposite sides of said seismic mass each having one electrode provided by at least a part of said seismic mass, the gap width of each said rebalance capacitor being defined approximately parallel to said sensing axis such that the electric fields established by said rebalance capacitors are also approximately parallel to said sensing axis, said gap width of each said rebalance capacitor being variable under said input acceleration, and circuit means responsive to said output signal for applying constant current independent of said gap width to either one of said rebalance capacitors such that said mass is driven toward said null position.

2. The accelerometer of claim 1, wherein said seismic mass is provided by a pivotally mounted pendulous mass and the application of said constant current to either rebalance capacitor causes a rebalance torque to be experienced by said pendulous mass.

3. The accelerometer of claim 2, further comprising timing means for establishing sampling periods, sampling means for sampling said detecting means output signal every sampling period, and switching means operatively connected to said circuit means and responsive to the output of said sampling means for directing said constant current to one or the other of said rebalance capacitors depending on said direction of displacement for a predetermined time interval during each said sampling period.

4. The accelerometer of claim 3, further comprising means responsive to said sampling means output for indicating over a period of time spanning a number of sampling periods the difference between the number of sampling periods in which displacement occurs in one direction and the number of sampling periods in which displacement occurs in the other direction, said difference being indicative of the magnitude of the change in velocity over said period of time.

5. The accelerometer of claim 2, wherein said detecting means includes a pair of pick-off capacitors each having an electrode provided by at least a part of said pendulous mass, the gap widths of said pick-off and rebalance capacitors being parallel and similarly variable in accordance with the location of said pendulous mass relative to said null position, angle sensing means operatively connected to said pick-off capacitors for comparing the difference in capacitance thereof to provide analog difference signal and means for comprising said analog difference signal to a fixed reference to produce said detecting means output signal in binary form indicative of said direction of displacement relative to said null position.

6. The accelerometer of claim 3, wherein each said rebalance capacitor has another electrode spaced axially from and not physically connected to said one electrode provided by said mass, said circuit means including a high gain differential amplifier having one input connected to a source of stable reference voltage and the other input connected to said one electrodes of said rebalance capacitors associated with said mass, a grounded impedance being connected in parallel with said one electrodes of said rebalance capacitors, the output of said differential amplifier being a constant current selectively connected via said switching means to said other electrodes of said rebalance capacitors.

7. The accelerometer of claim 6, wherein said constant current provided by said differential amplifier is approximately represented by said reference voltage divided by the value of said impedance.

8. The accelerometer of claim 7, wherein said switching means further includes means for discharging said rebalance capacitors before said constant current is applied thereto in each sampling period.

9. An electrostatic pendulum accelerometer, comprising a gas-tight enclosure containing a pendulum assembly including a flat U-shape pendulum having a non-conductive body, a pair of inner conductive pick-off plates mounted to opposite sides thereof at first areas and a pair of inner conductive torquer plates mounted to opposite sides thereof at second areas, a base mounted to said enclosure and fluxure hinge means for resilienting mounting the legs of said pendulum to said base to allow pivotal movement of the pendulum with respect to said base in either direction from a null position about a flexure hinge axis under input accelerations along a sensing axis perpendicular to said pendulum in the null position, a pair of outer conductive pickoff plates mounted to the inside of said enclosure parallel to said pendulum in the null position and facing said first areas on opposite sides of said pendulum, a pair of outer conductive torquer plates mounted to the inside of said enclosure parallel to said pickoff facing said second areas on opposite sides of said pendulum, and a dielectric fluid disposed within said enclosure between said outer pickoff and torquer plate and said pendulum, pickoff circuit means for comparing the capacitance established by adjacent outer and inner plates to produce a binary control signal indicative of the polarity of displacement of said pendulum, and rebalance circuit means for applying constant current to one or the other outer torquer plates depending on the state of said control signal to move said pendulum toward said null position by means of electrostatically applied torque.

* * * * *